United States Patent
Murphy et al.

(10) Patent No.: US 6,776,116 B2
(45) Date of Patent: Aug. 17, 2004

(54) SWIVEL/QUICK RELEASE DEVICE FOR TOW ROPE

(76) Inventors: Michael Murphy, 33124 Case St., Lake Elsinore, CA (US) 92530; Donald M. Erb, Jr., 4457 Big Branch Rd., Shingle Springs, CA (US) 95628; Charles D. Peterson, 3443 Valley View Rd., Rescue, CA (US) 95672; Stephen G. Conover, 3391 Kensington Dr., El Dorado Hills, CA (US) 95762

( * ) Notice: Subject to any disclaimer, the term of this patent is extended or adjusted under 35 U.S.C. 154(b) by 0 days.

(21) Appl. No.: 10/401,933

(22) Filed: Mar. 28, 2003

(65) Prior Publication Data

US 2004/0020418 A1 Feb. 5, 2004

Related U.S. Application Data

(63) Continuation of application No. 10/211,447, filed on Aug. 2, 2002.
(60) Provisional application No. 60/309,302, filed on Aug. 2, 2001.

(51) Int. Cl.[7] ................................................. B63B 21/04
(52) U.S. Cl. ........................ 114/253; 114/247; 24/602
(58) Field of Search ............................... 114/253, 247, 114/230.18; 267/71, 74, 113; 24/598.5, 602

(56) References Cited

U.S. PATENT DOCUMENTS

| | | | | |
|---|---|---|---|---|
| 3,125,790 A | * | 3/1964 | Gaylord ....................... | 24/602 |
| 3,413,692 A | * | 12/1968 | Pressley ..................... | 24/602 |
| 5,430,914 A | * | 7/1995 | Patterson et al. .......... | 24/598.5 |

* cited by examiner

*Primary Examiner*—S. Joseph Morano
*Assistant Examiner*—Lars A. Olson
(74) *Attorney, Agent, or Firm*—Joseph E. Mueth

(57) ABSTRACT

A swivel/quick release device having a shaft adapted to receive a load at one end operated associated with a bearing means at its other end; a housing in which said shaft is slidably mounted.

A release and attachment means is disposed in the housing around the bearing means releasably retaining an attachment for a tow rope.

Spring means is present within the housing and engaging the shaft such that as a load is increasingly applied to one end of the shaft, the spring means is compressed within the housing until the attachment for a tow rope is released.

8 Claims, 24 Drawing Sheets

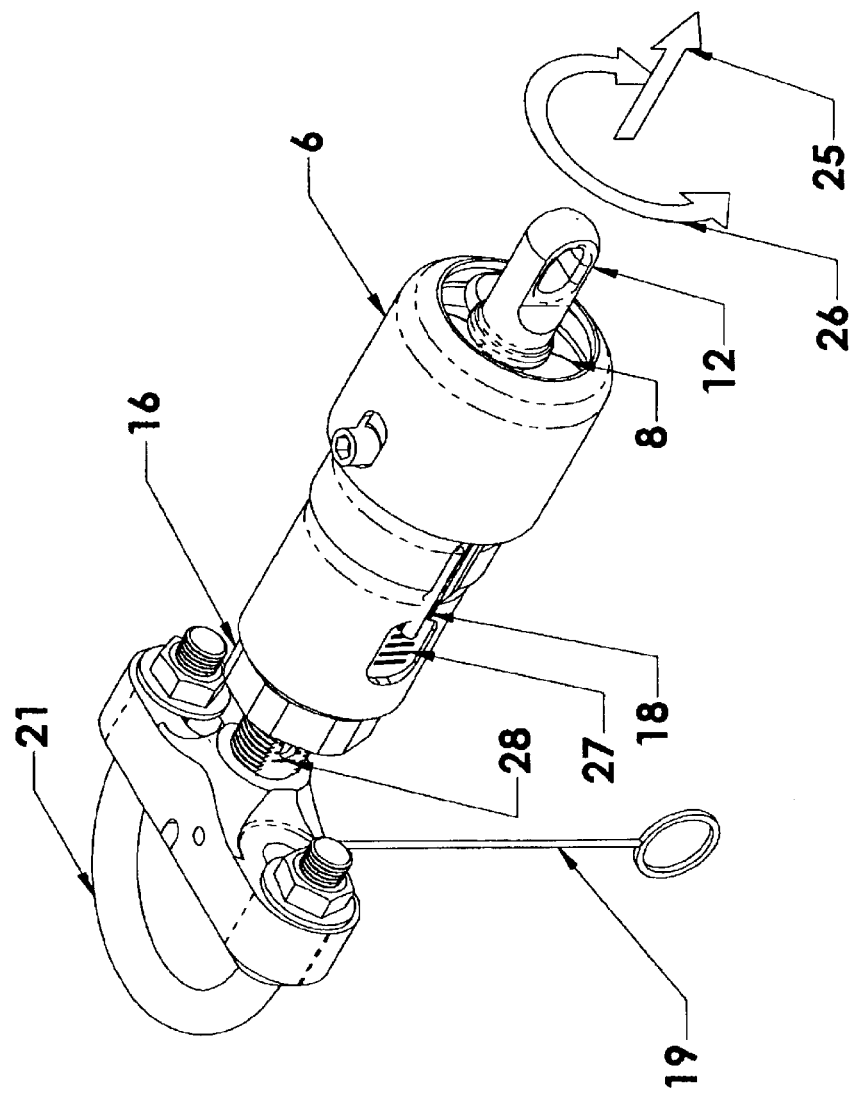
Fig. A

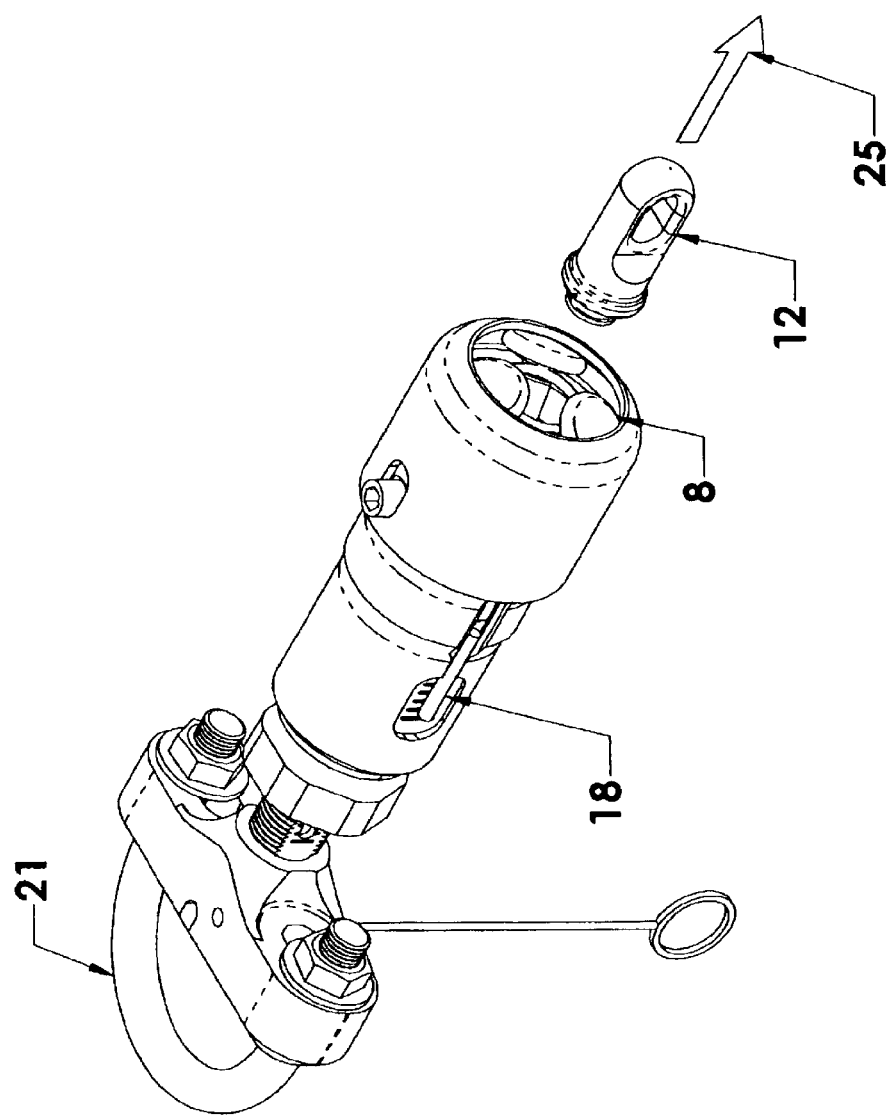
Fig. B

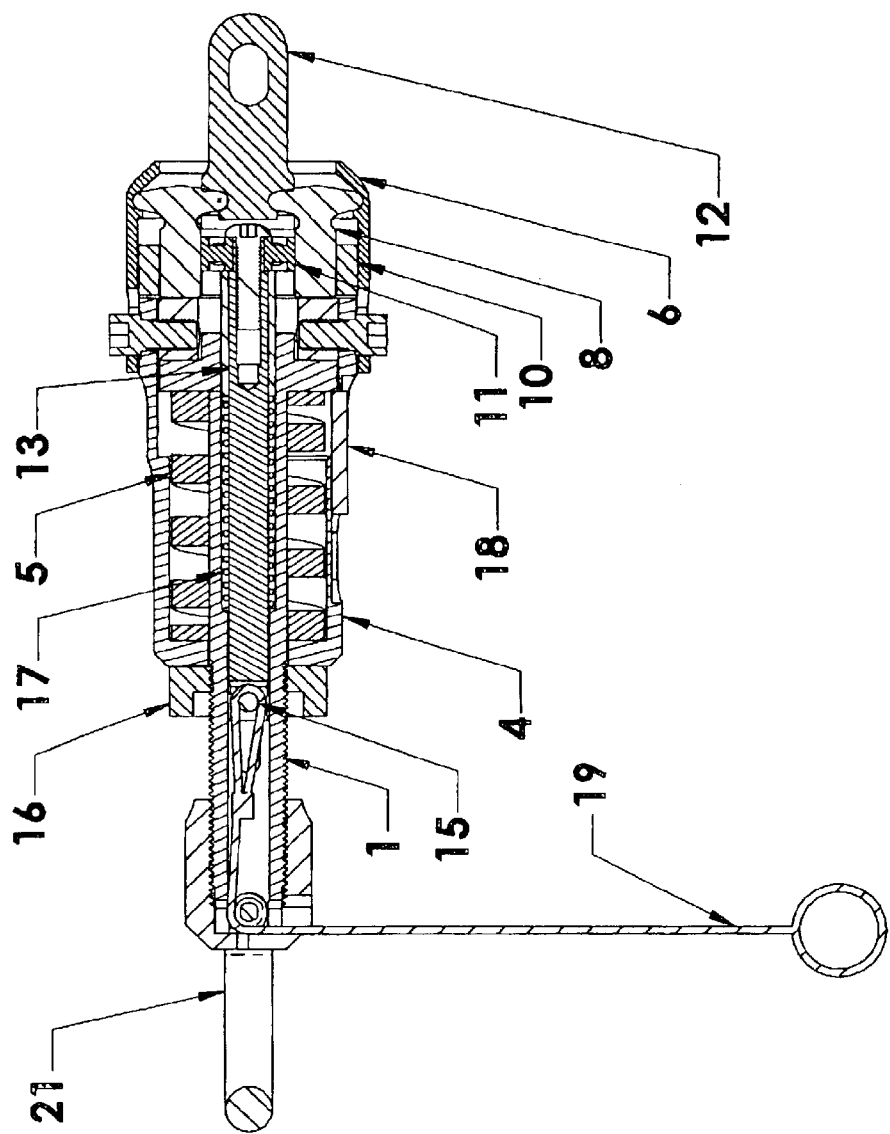
Fig. C

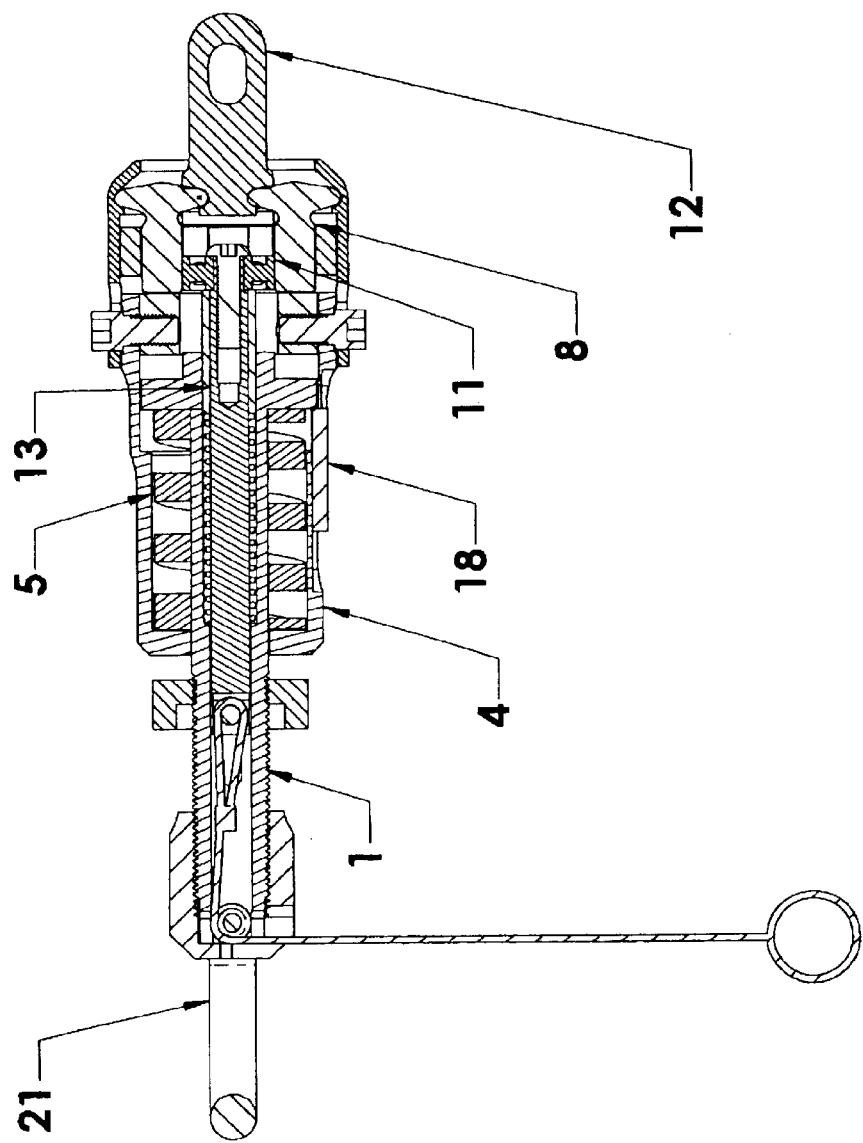
Fig. D

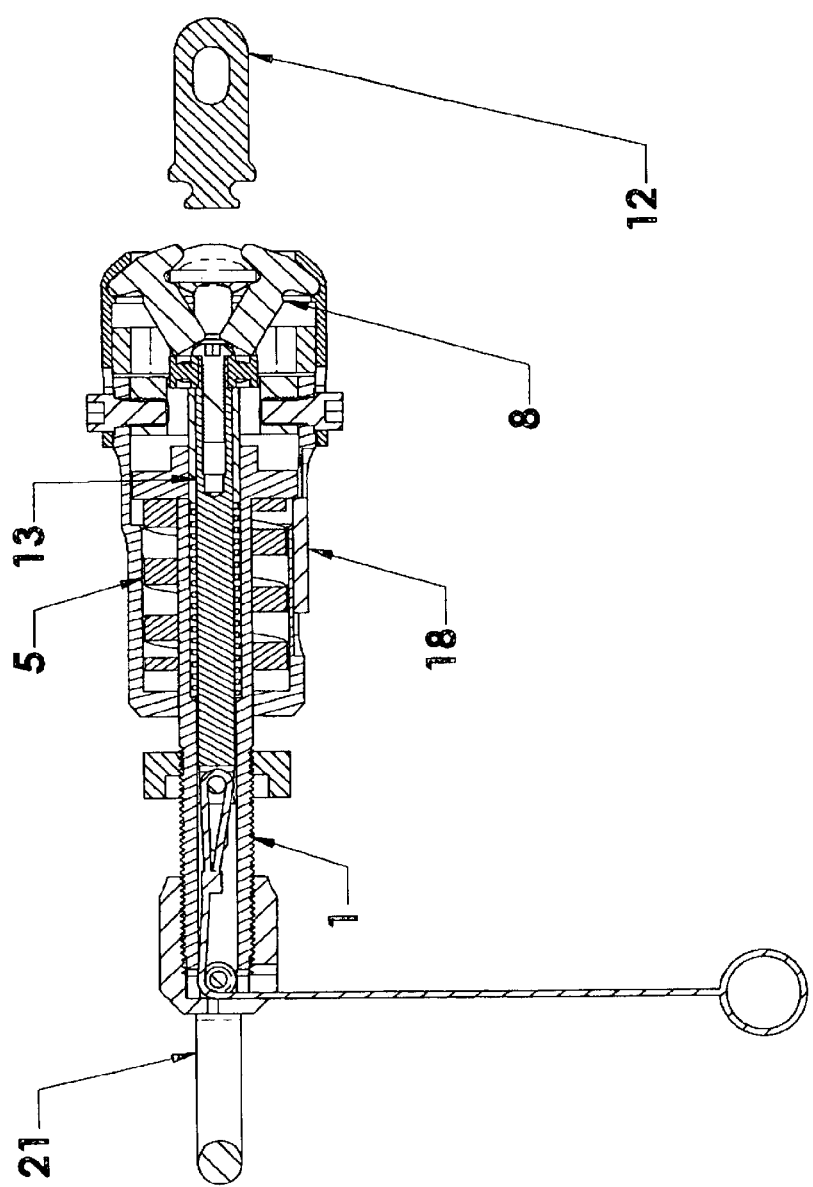
Fig. E

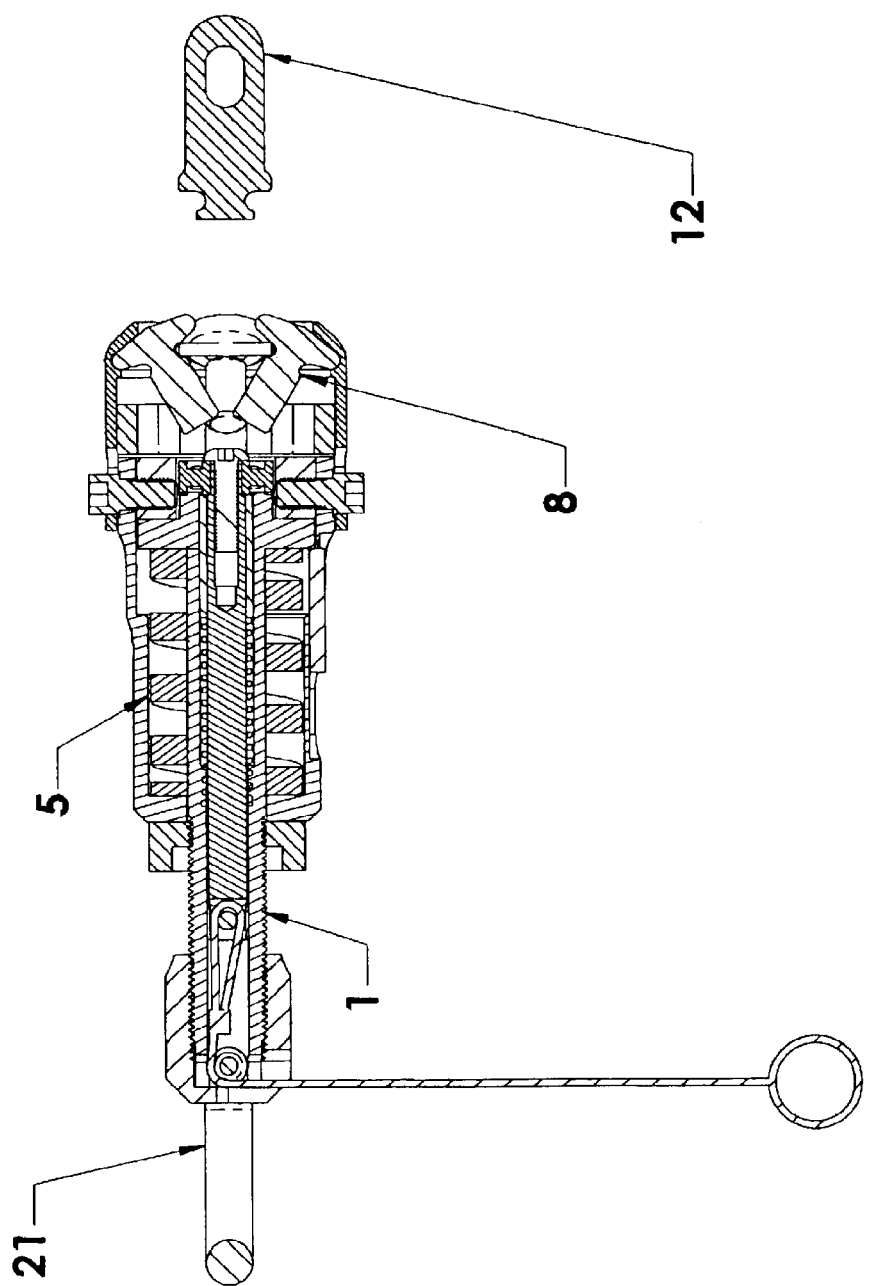
Fig. F

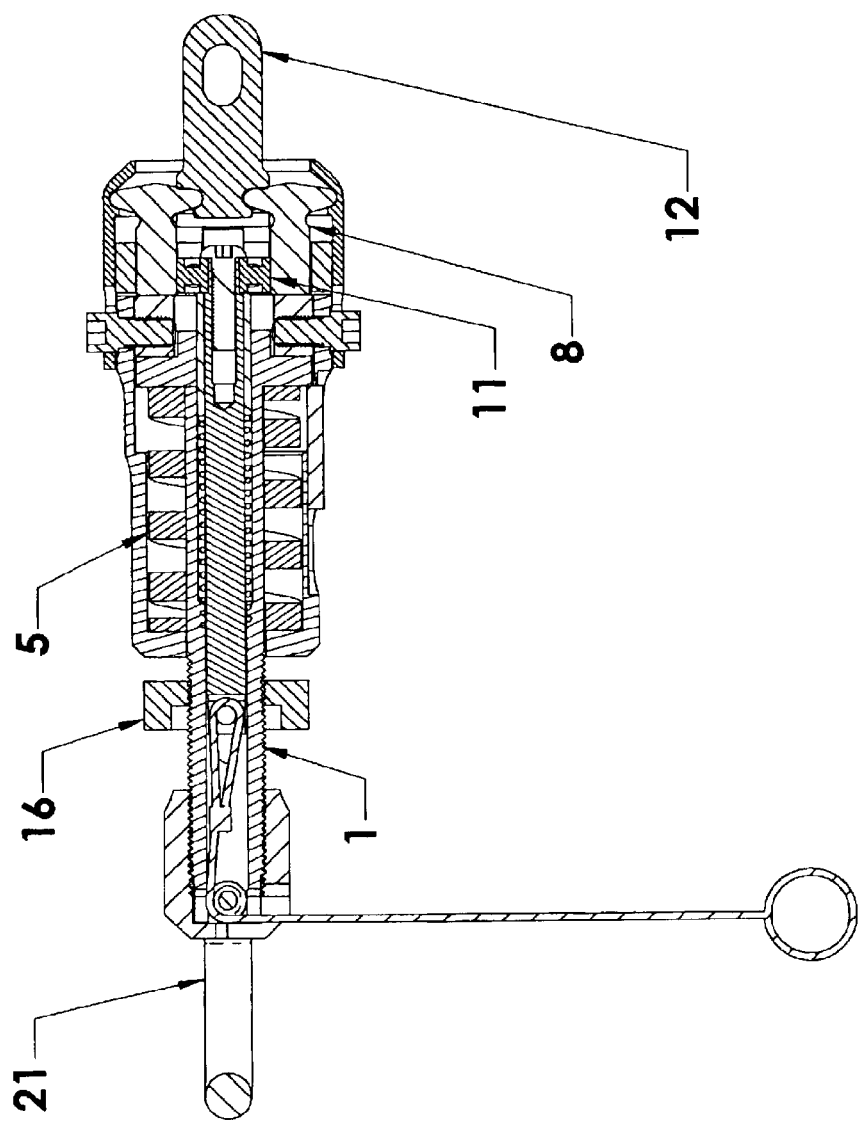
Fig. G

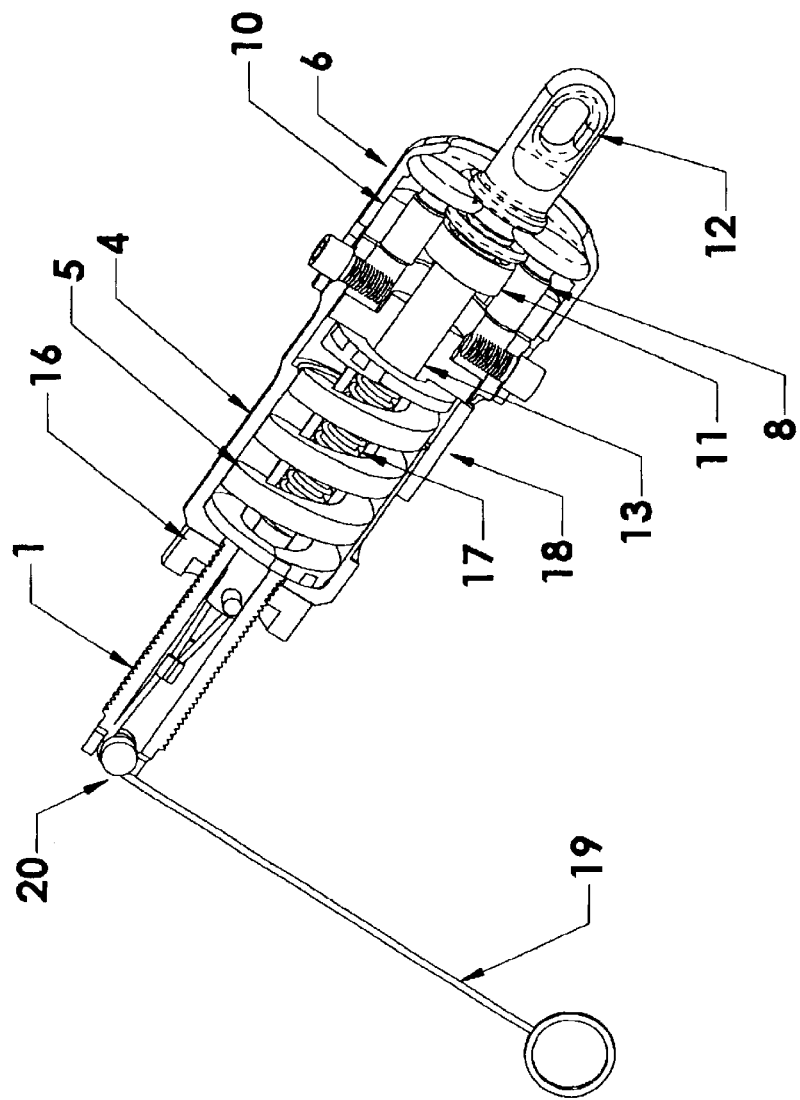
Fig. H

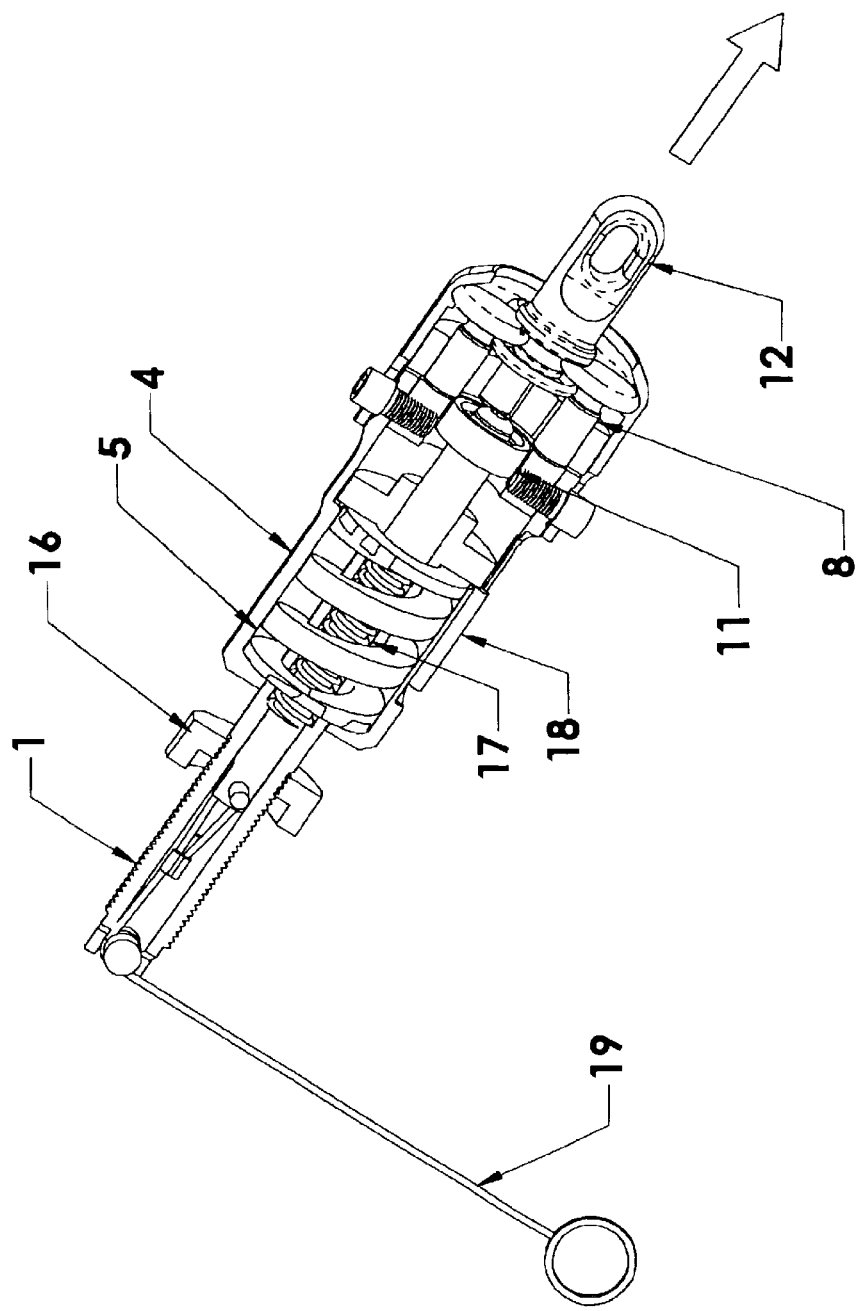
Fig. J

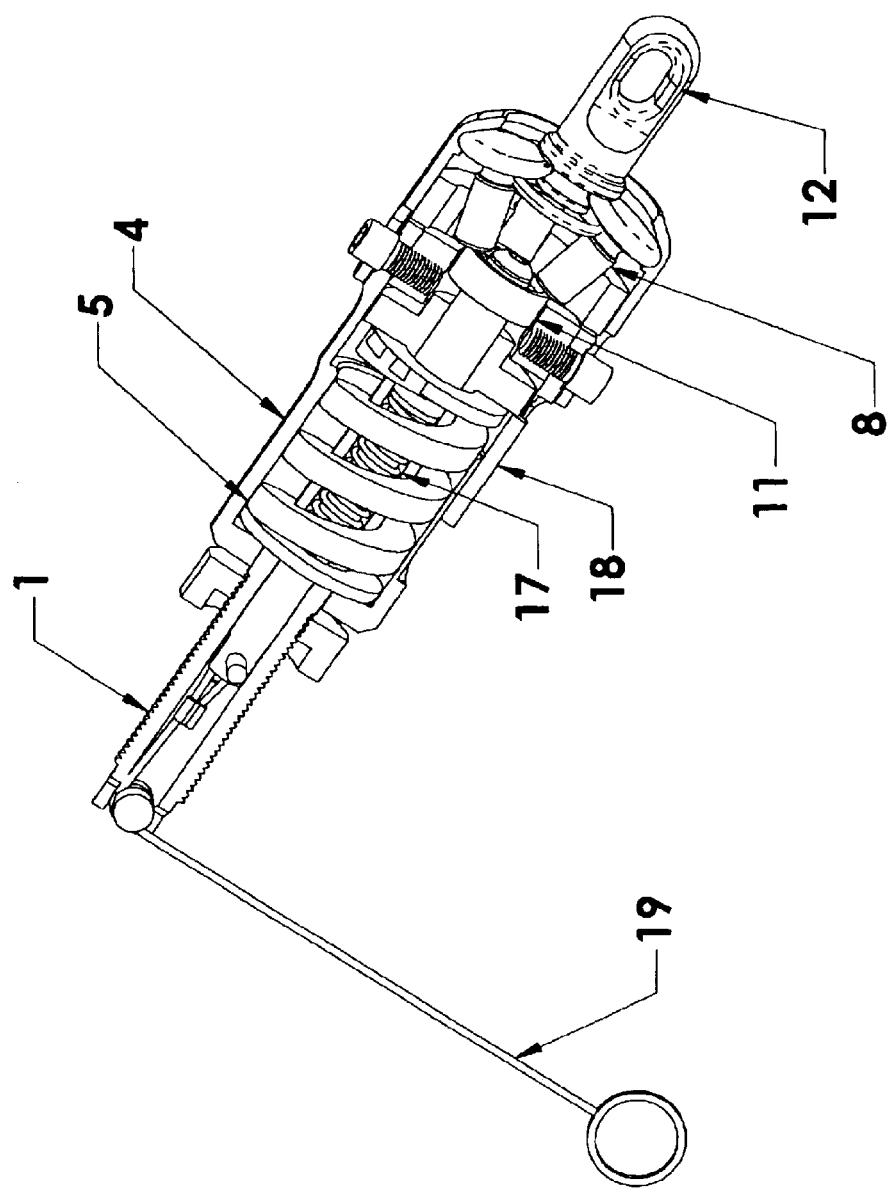
Fig. K

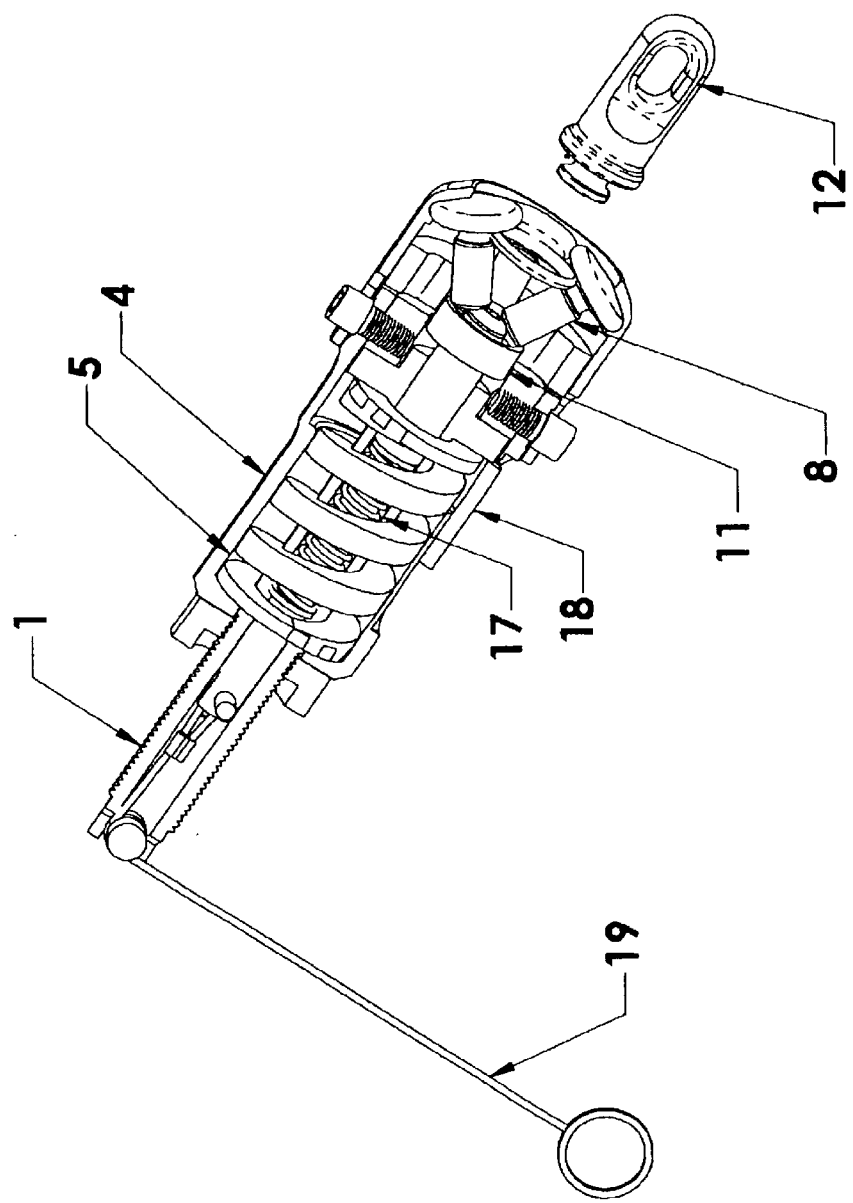
Fig. L

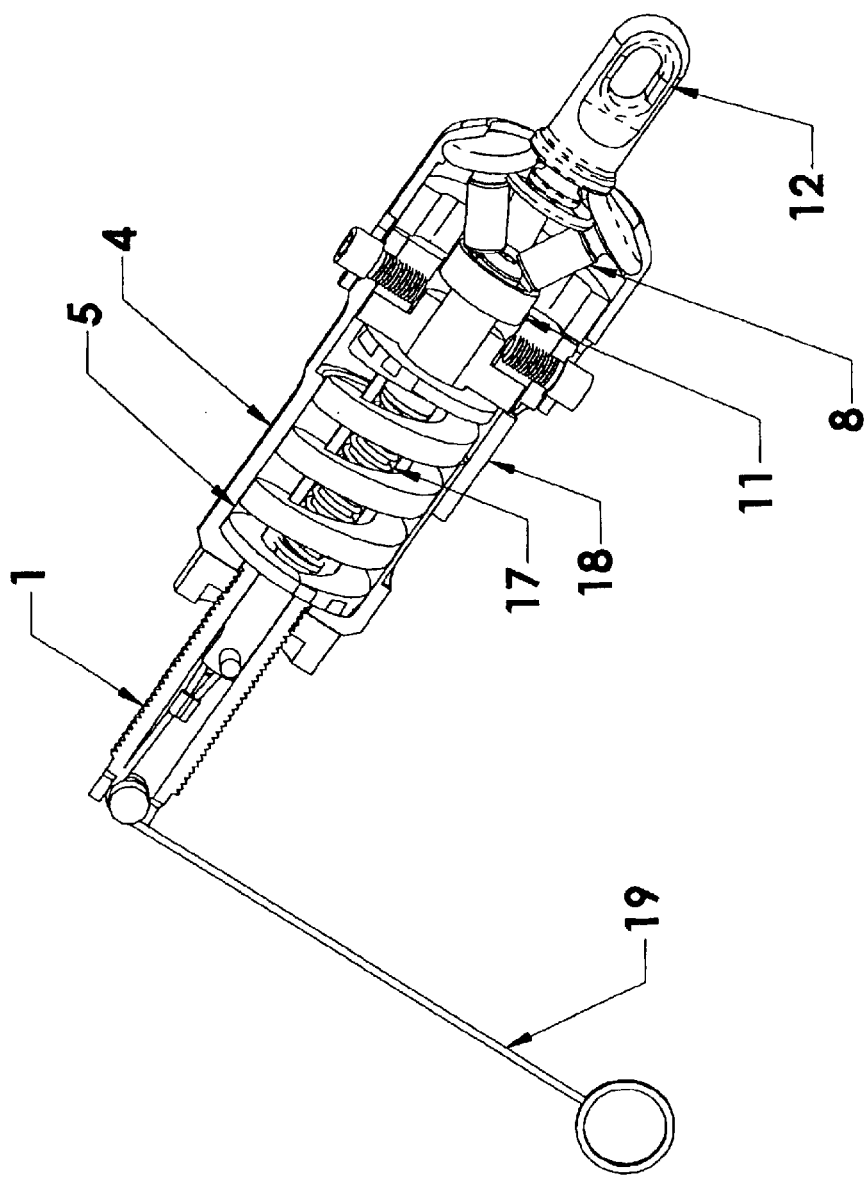
Fig. M

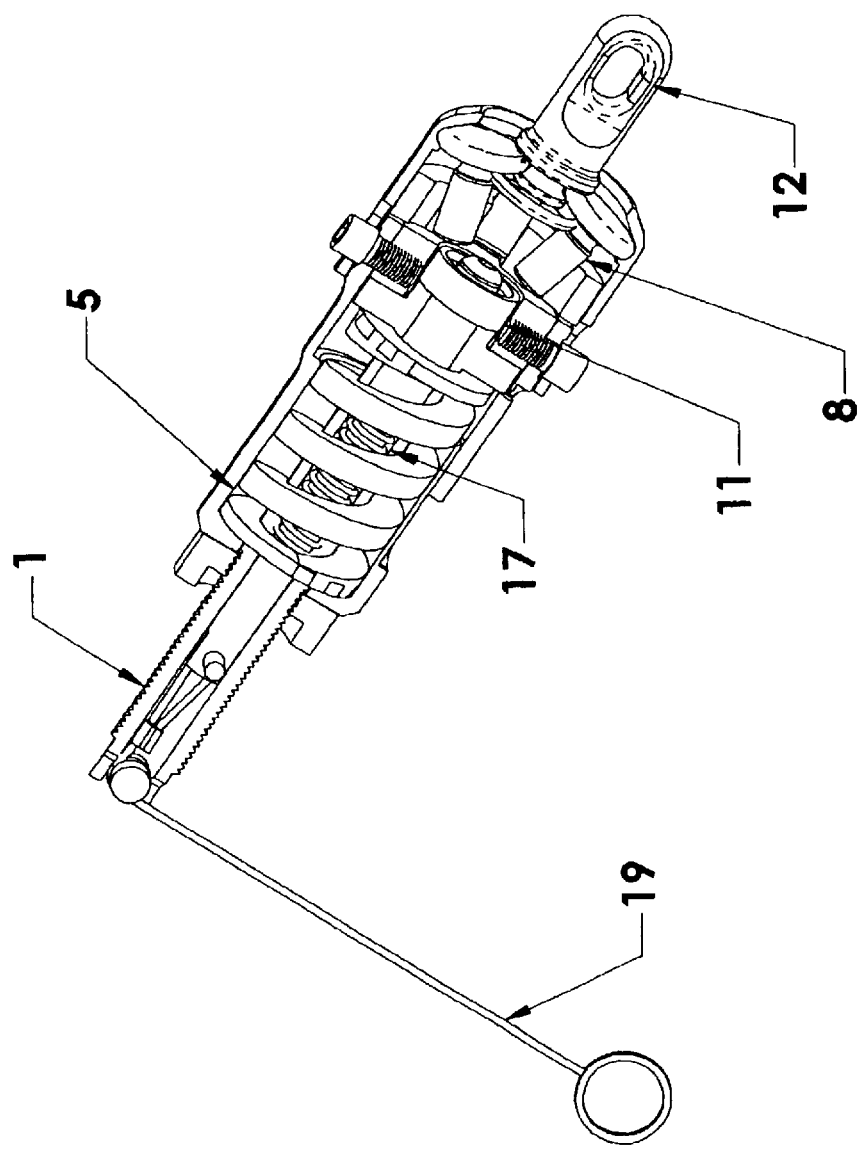
Fig. N

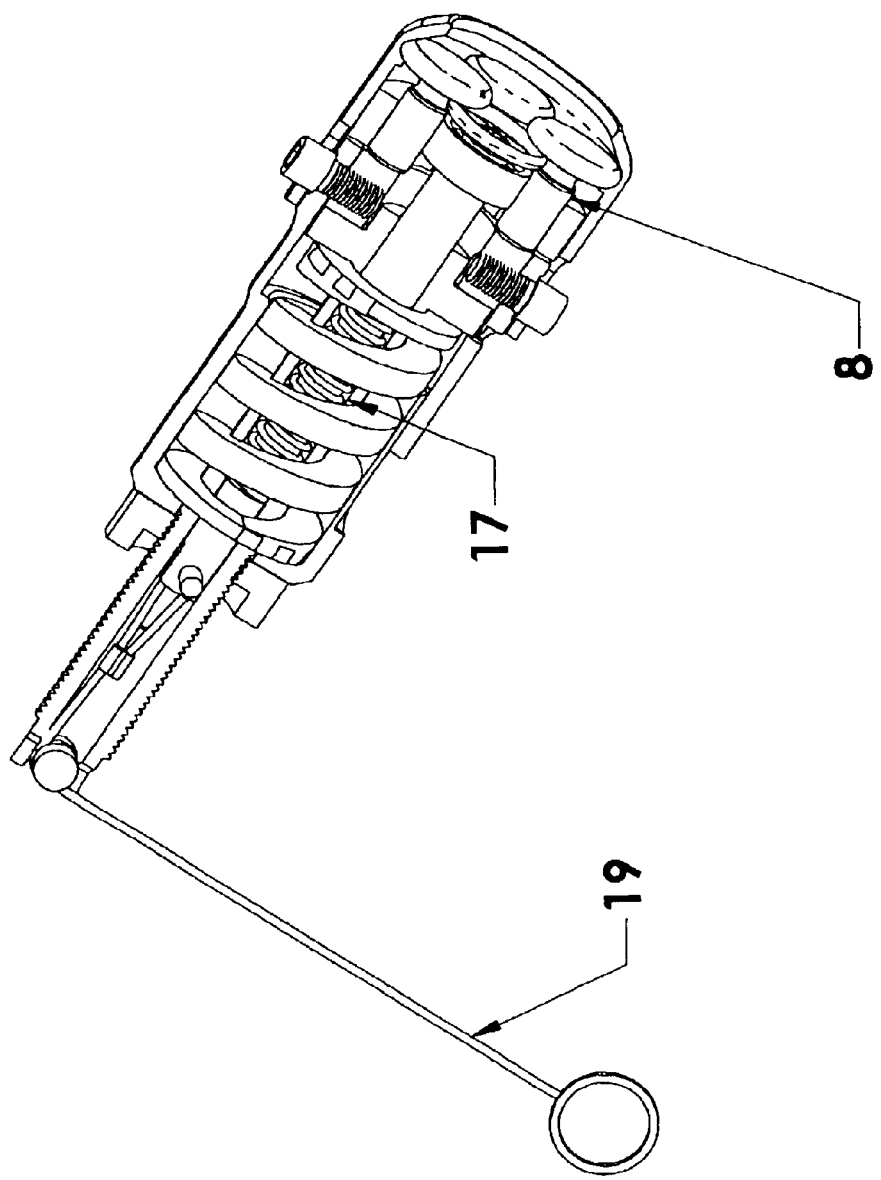
Fig. O

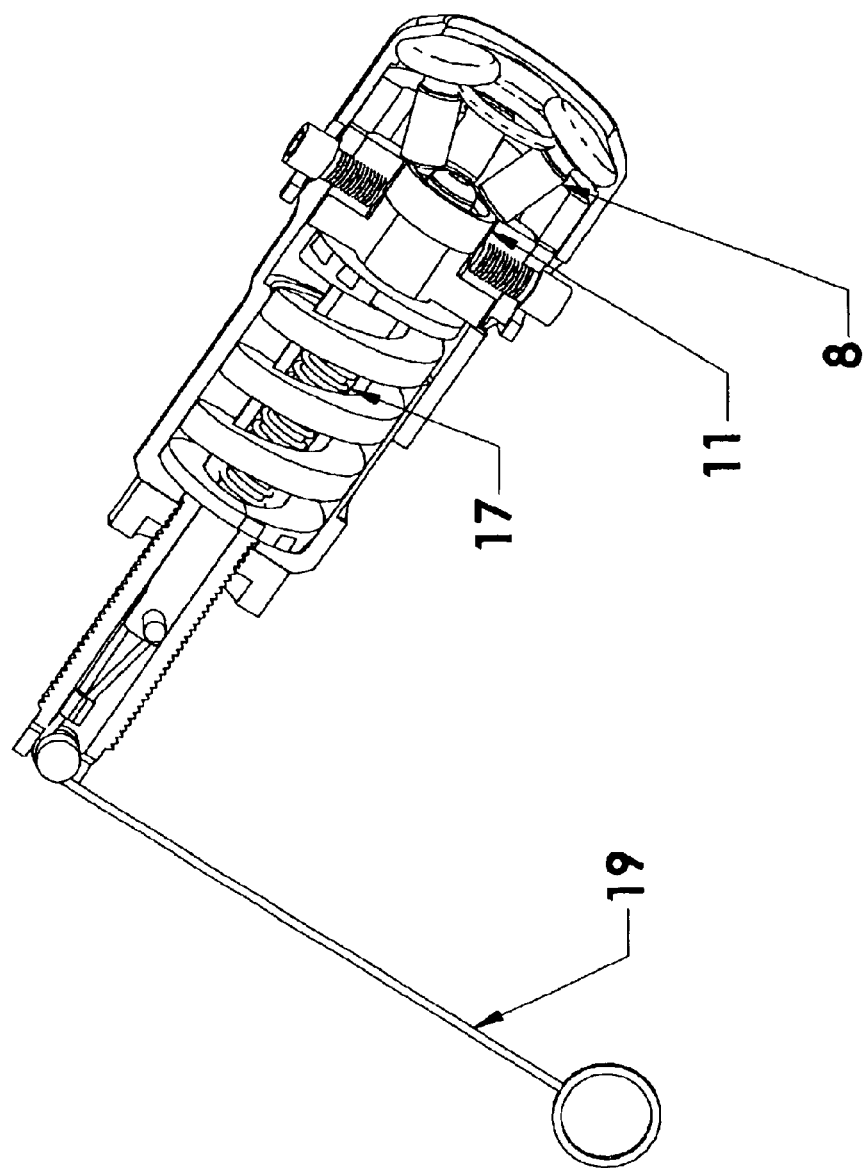

SECTION A-A

SECTION A-A

SECTION A-A

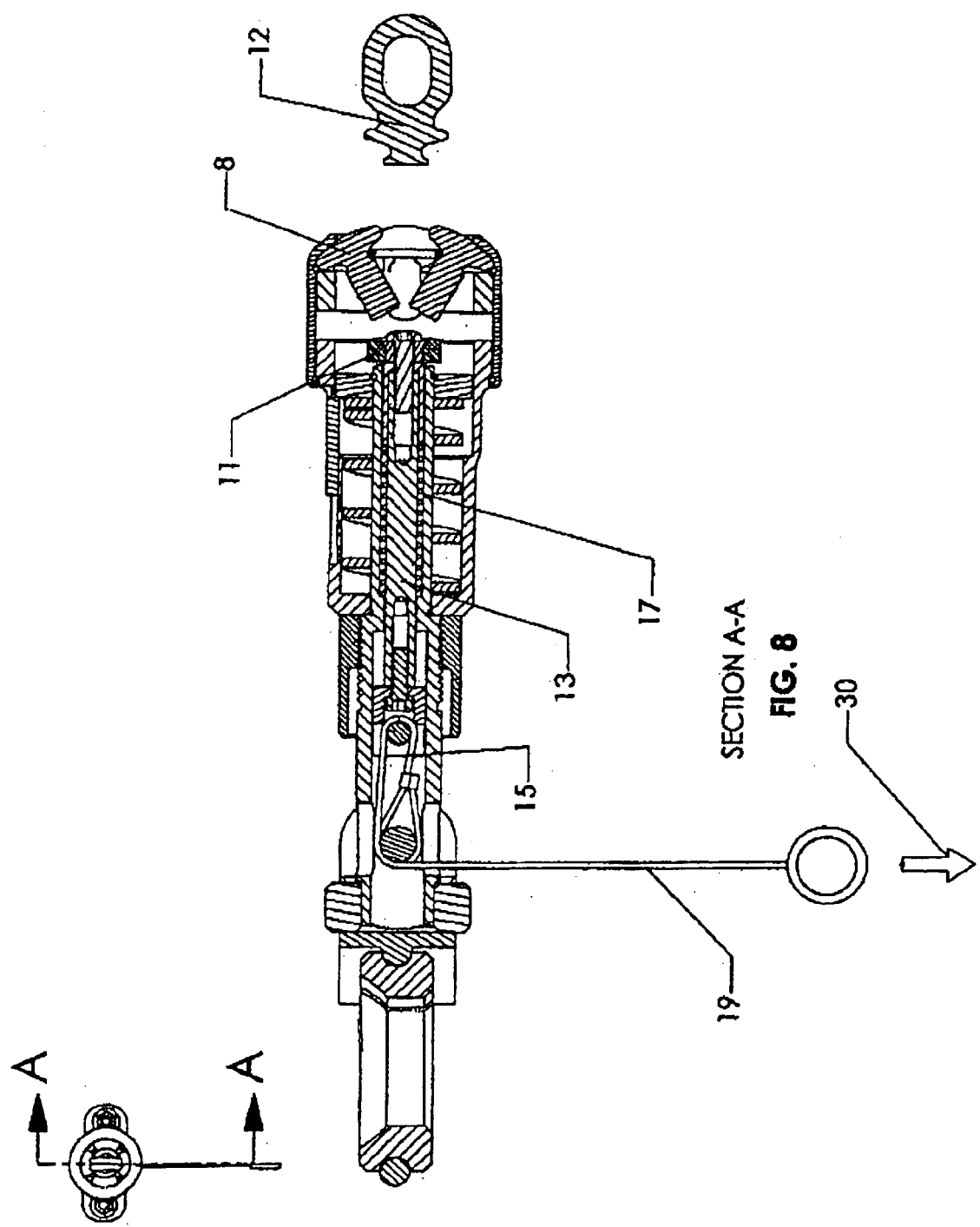

SWIVEL/QUICK RELEASE DEVICE FOR TOW ROPE

This application claims the benefit of Provisional Patent Application No. 60/309,302, filed Aug. 2, 2001. This application is a continuation of U.S. patent application Ser. No. 10/211,447 filed Aug. 2, 2002.

BACKGROUND OF THE INVENTION

Water skies are towed behind power boats. Typically, the skier grabs a handle attached to a tow rope. The other end of the tow rope is affixed to the rear of the power boat. At speed, the skier may perform jumps, and other tricks and maneuvers. These activities can cause the tow rope to become twisted. In the event of a spill, the skier can become entangled in the tow rope or dragged along behind the power boat for a considerable distance. The skier may also become caught up by the handle carried at the end of the tow rope.

To reduce these problems, we have developed a swivel/quick release which can be connected directly to the power boat or can be incorporated at some point along the length of the tow rope. The device enables the skier to be freed from the pulling force exerted on the tow rope by the power boat in the event of a spill.

SUMMARY OF INVENTION

Briefly, the present invention comprehends a swivel/quick release device comprising:

a shaft adapted to receive a load at one end and operably associated with a bearing means at its other end;

a housing in which said shaft is slidably mounted;

a release and attachment means disposed in said housing around said bearing means releasably retaining an attachment for a tow rope;

spring means within said housing and engaging said shaft such that as a load is increasingly applied to one end of the shaft, said spring means is compressed within said housing until said load attachment for a tow rope is released.

The swivel/quick release can be mounted stationary to the tow point of the boat by a bracket with a metal type fastener that may also feature a swivel on the end of the boat attachment to allow the rope to travel left to right freely zero to 360 degrees. It may also be a non-stationary rope swivel attachment of this invention allows the rope attached to it to twist 360 degrees while the skier is using the rope and handle, eliminating twist in the rope and allowing the rope to spin twist free. This swivel mechanism eliminates the problems associated with retrieving and using traditional rope attachments that twist and knot when the rider performs 360 degree/180 degree tricks and maneuvers. The swivel prevents knots/kinks when in use and extends the life of the rope by reducing wear and tear.

The release mechanism of this invention serves as a safety devise that releases manually or can be set to release automatically should the skier fall or be caught in the rope or handle. The release feature of this invention allows the rider to set a degree of pressure that will release the rider in the event of an accident.

Incorporated in this devise is a load recorder. The purpose of the load recorder is to measure the amount/degree of tension or load applied by the rope during tricks and maneuvers. Based on the tension/load by adjusting the release load adjuster. In the event of an accident (excessive amount of tension/load due to a hazardous situation such as i.e., a rider's limbs or a piece of the rider's's equipment is caught in the rope or handle) the release roller would then open and release the ski rope attachment reducing pressure or stress to these elements. By measuring the amount/degree of tension/load the rider can predetermine and set the desired tension/load limit point at which The safety release would engage and release The riders rope. Factors that would determine tension/load are The riders weight, difficulty and height of trick or maneuver.

The device of this invention can be made out of but not limited to metal or a composite type petroleum Based product such as polypropylene.

DESCRIPTION OF PREFERRED EMBODIMENT

In the drawings:

FIG. A is a perspective view of the swivel/quick release of this invention, shown fully assembled.

FIG. B is a perspective view of the device of FIG. A with rope attachment released by rope overload.

FIG. C is a longitudinal section through the device of FIG. A, with no load applied.

FIG. D is a sectional view similar to FIG. C, but with the rope under tension but at less than release load.

FIG. E is similar to FIG. D with the device shown at release load.

FIG. F is similar to FIG. E, but where the release occurs manually rather than by loading.

FIG. G is similar to FIG. C with the device adjusted to release at a lighter load.

FIG. H is a partial section perspective view of the device in the state shown in FIG. C.

FIG. I is a partial section perspective view of the device in the state shown in FIG. D.

FIG. J is a partial section perspective view of the device of FIG. E, but prior to release of the rope attachment.

FIG. K is a partial section perspective view of the device of FIG. J, but just after the release load is exceeded with the rope attachment beginning to separate.

FIG. L is a partial section perspective view with the rope attachment completely separated.

FIG. M is a partial section perspective view during installation or re-installation of the rope attachment.

FIG. N is a partial section perspective view showing the operation of the device during manual emergency release of the rope attachment.

FIG. O is a partial section perspective view of the device in the loaded position, but with no rope attachment in place.

FIG. P is a partial section perspective view of the device as it appears during manual re-cocking in preparation for the installation or re-installation of the rope attachment.

FIG. 8 is similar to FIG. 5, but where the release occurs manually by use of the emergency release, rather than by loading.

Figure 1:
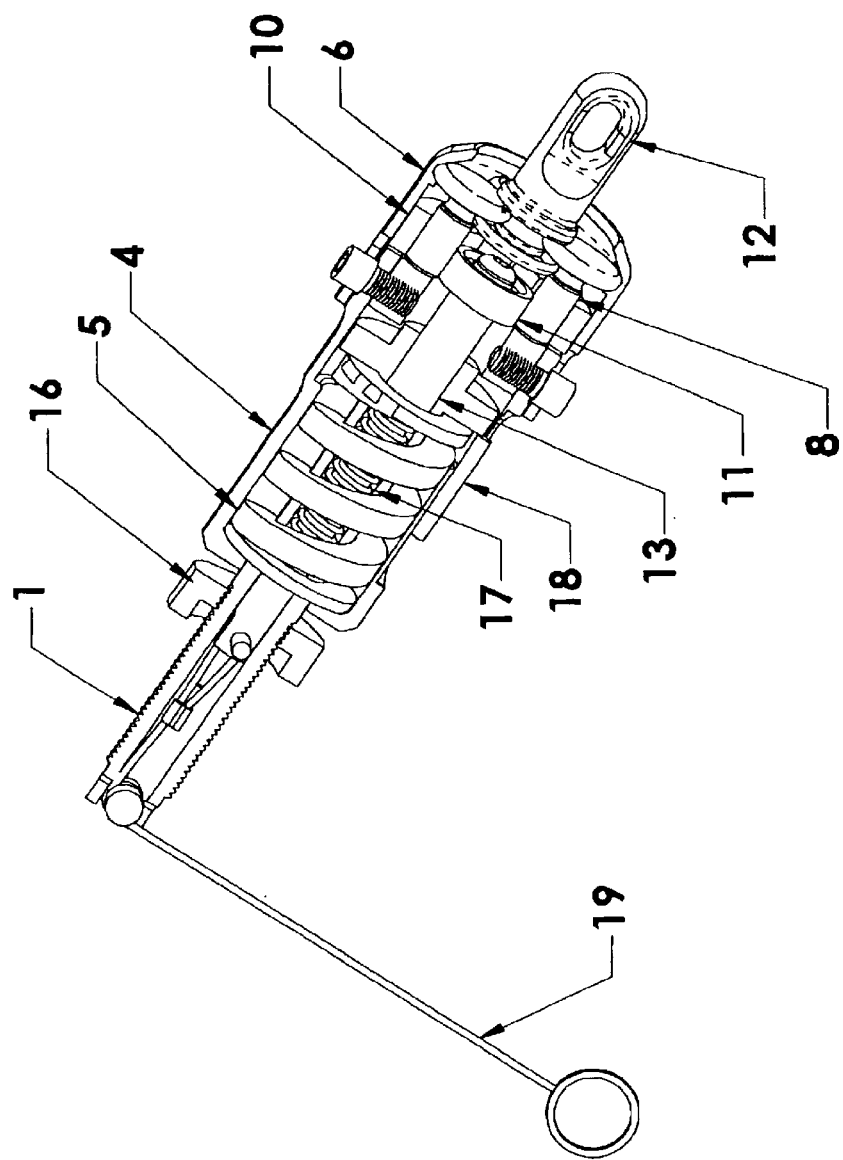
FIG. 1 is a perspective view of the swivel/quick release of this invention, shown fully assembled with no load applied.
Figure 1:
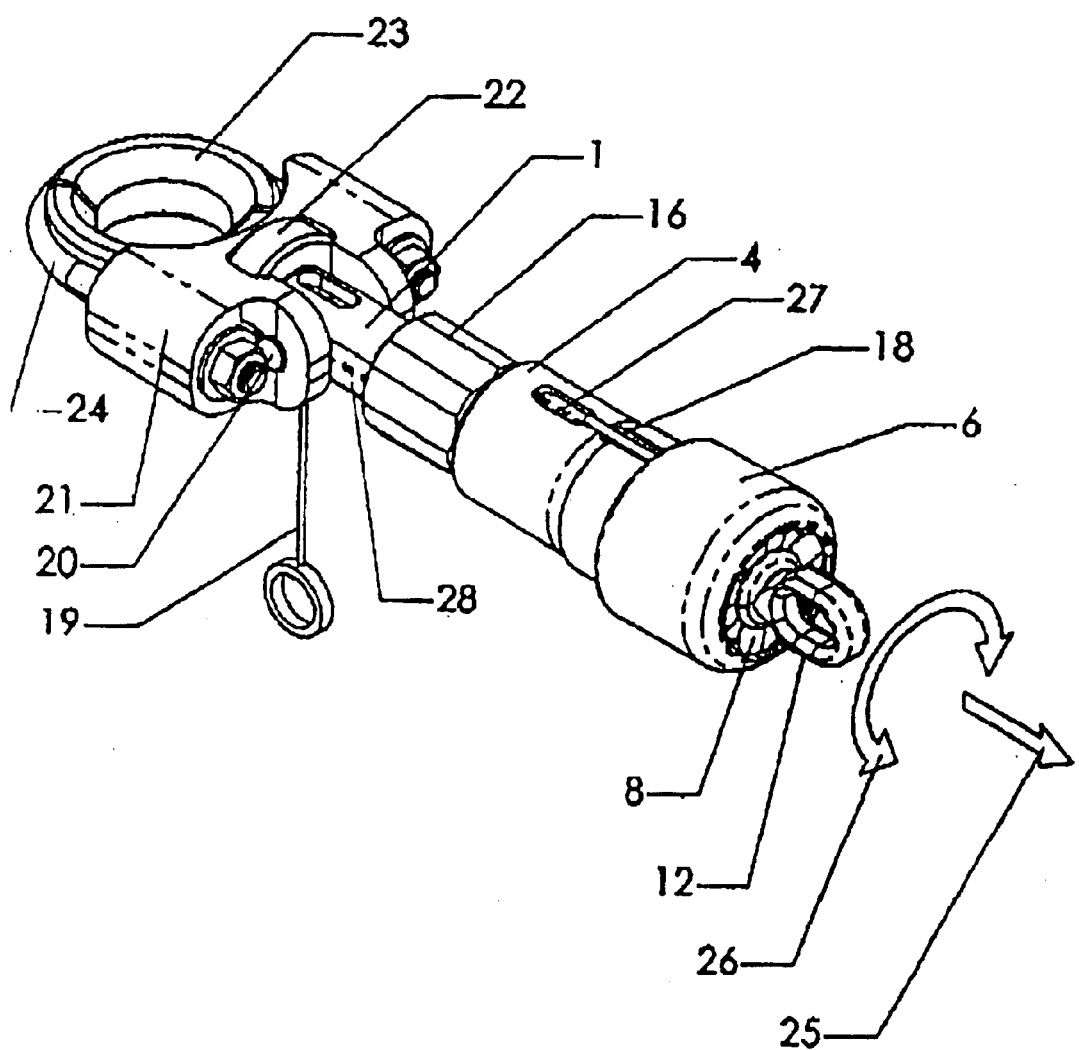

Turning to the drawings of FIGS. 1 to 8 in greater detail, the swivel/quick release device of this invention includes a main shaft 1, spring housing 4, mainspring 5, spring seat 2, spring seat retaining ring 3, loading sleeve 6, retaining ring 7, release rollers 8, roller retainer pin 9, roller cage 10, center bearing 11 and rope attachment 12.

The amount of load necessary to release the rope attachment 12 can be changed by rotating the release load adjuster 16. The release shaft 13 is surrounded by release shaft spring 17. The release shaft has a release shaft clevis 14 and adjuster pin 15.

The device as shown as four release rollers 8. However, three rollers can be used when using larger rollers, and more than four release rollers can be used, employing smaller rollers.

Figure 2:
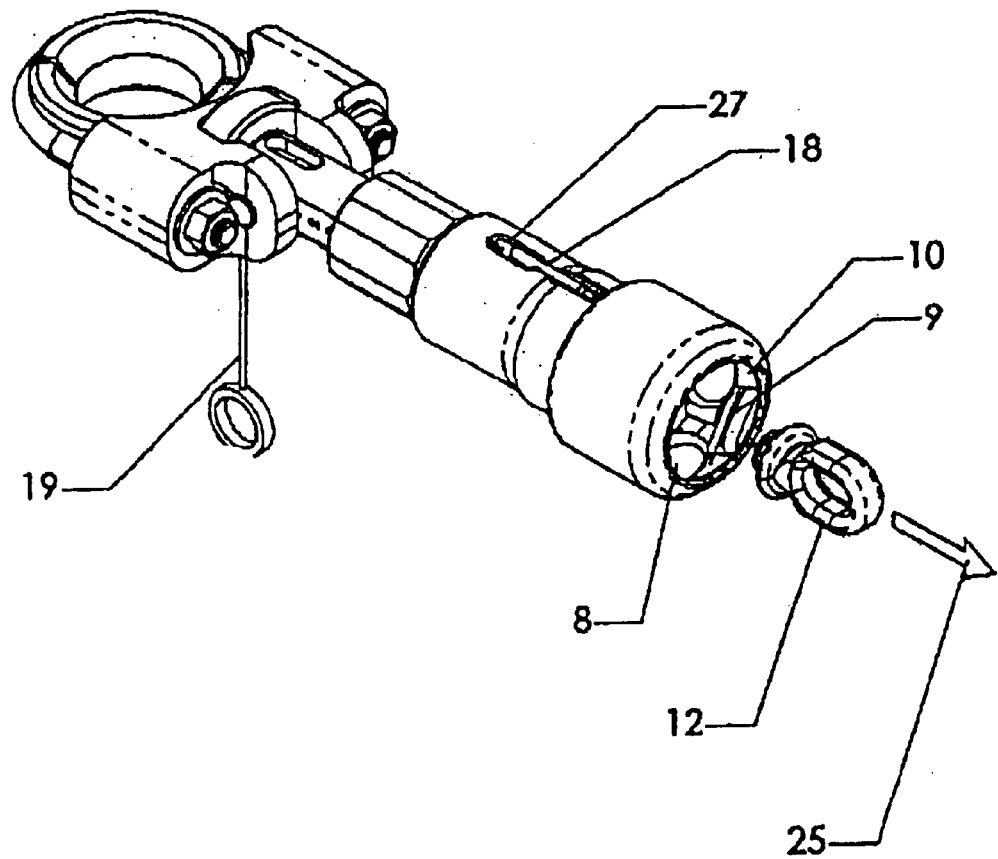
FIG. 2 is a perspective view of the device of FIG. 1 with the rope attachment released by rope overload.
Figure 3:
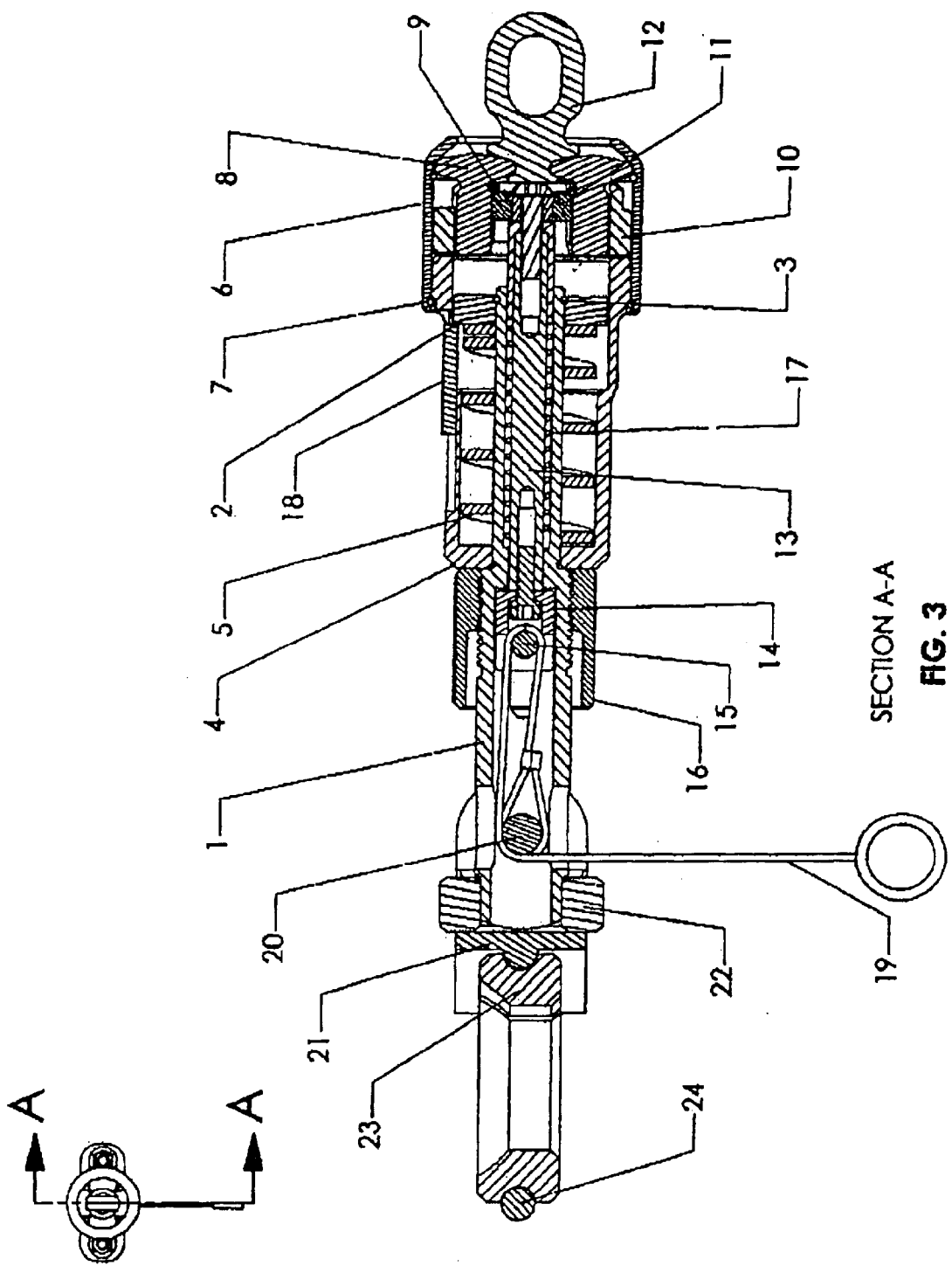
FIG. 3 is a longitudinal section taken along section A—A, also in FIG. 3, wit the swivel/quick release of FIG. 1 with no load applied.
Figure 4:
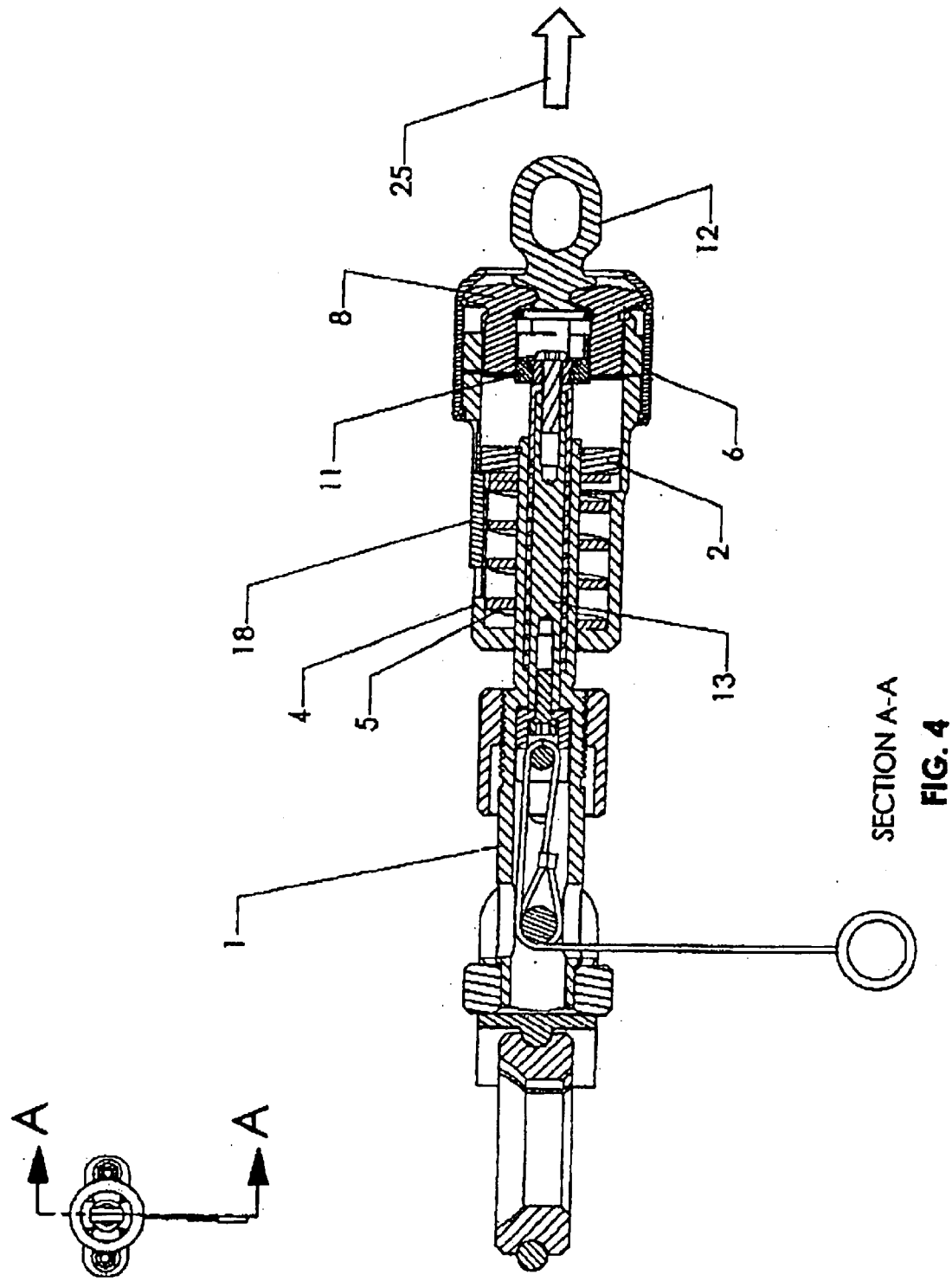
FIG. 4 is a section view similar to FIG. 3, but with the rope under tension but at less than release load.
Figure 5:
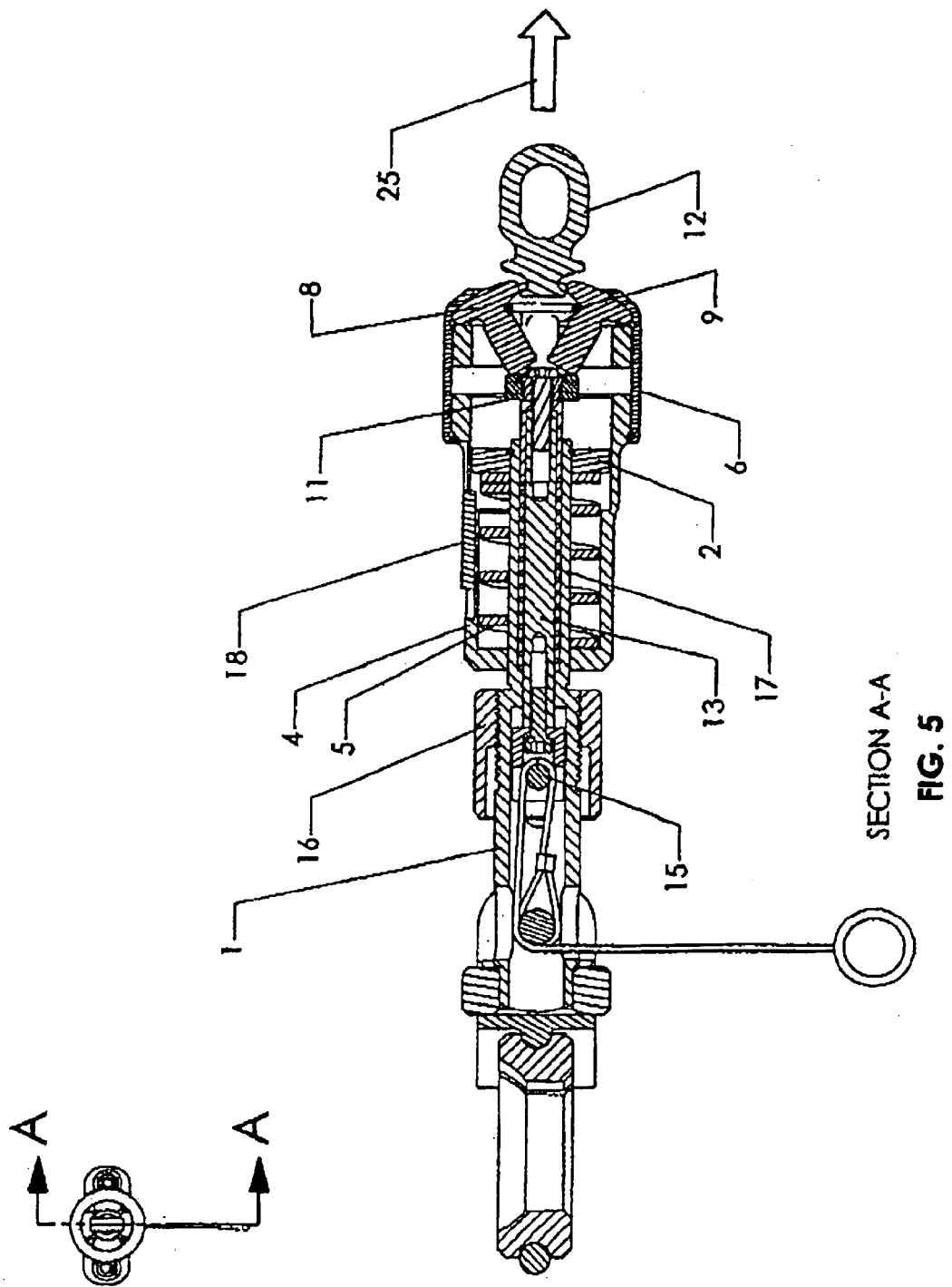
FIG. 5 is similar to FIG. 4 with the device shown at release load.

The load memory 18 is a length of rigid nylon which slides along a retaining groove in the spring housing 4 when the main spring seat 2 of the main shaft keeps the load memory from following the spring housing displacement as load is applied. The scale 27 beneath the load memory 18, FIG. 2, is etched into place. Once the load has been recorded, it is intended to be re-set by manually returning the length of rigid nylon to the original position.

The release shaft 13 within the main shaft 1 has its own bearing return spring 17. The bias of this spring must be overcome manually to release the attachment for a tow rope for re-cocking.

The emergency release cable 19 is held by attaching pin 20.

The boat attachment 21 has an attachment grommet 22, bearing ring 23 and attachment U bolt 24.

The load setting scale 28, FIG. 1, serves to indicate the setting established as release load adjuster 16 is rotated.

Figure 6:
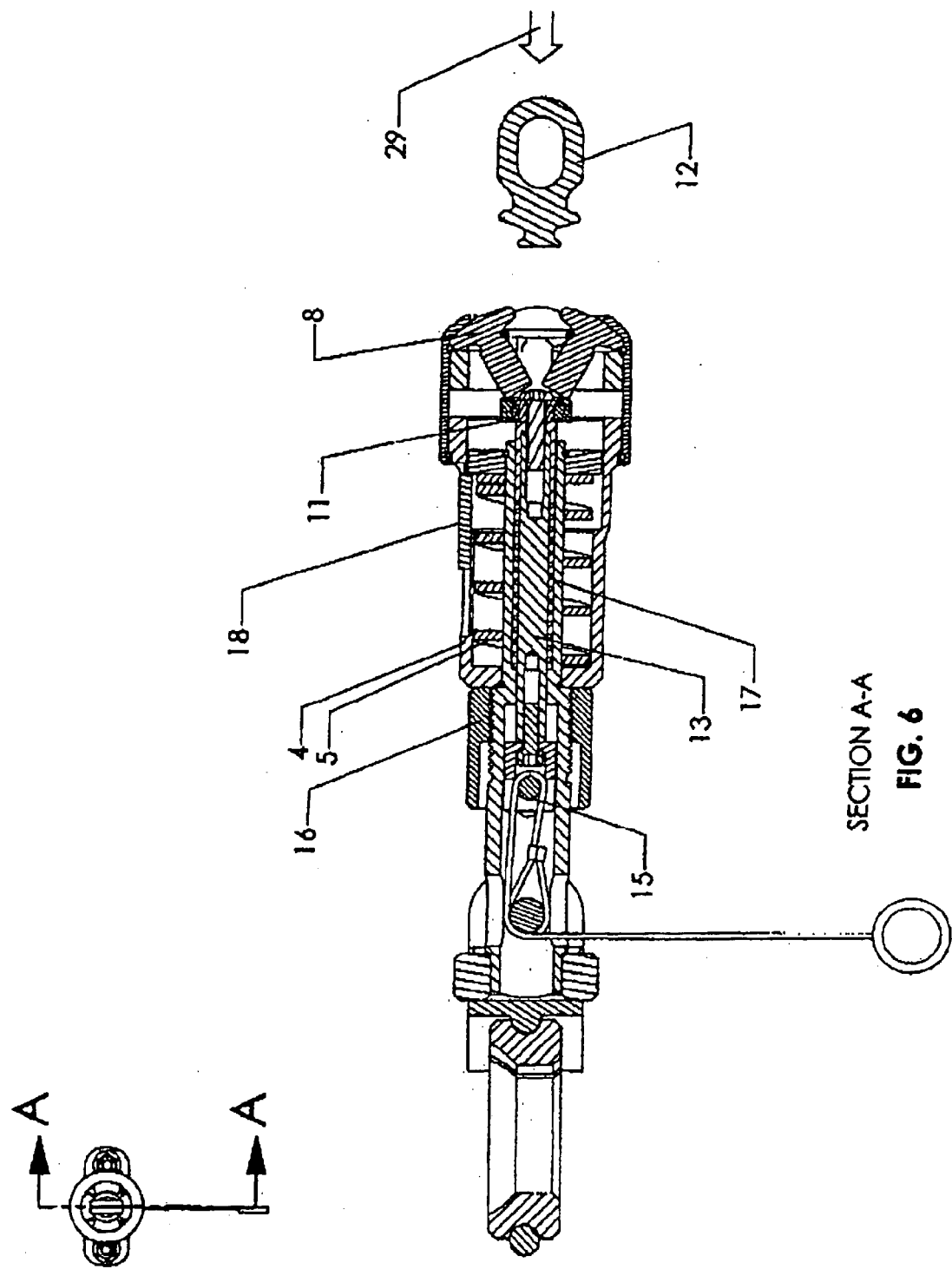
FIG. 6 is similar to FIG. 5 showing the device during installation or re-installation of the rope attachment.
Figure 7:
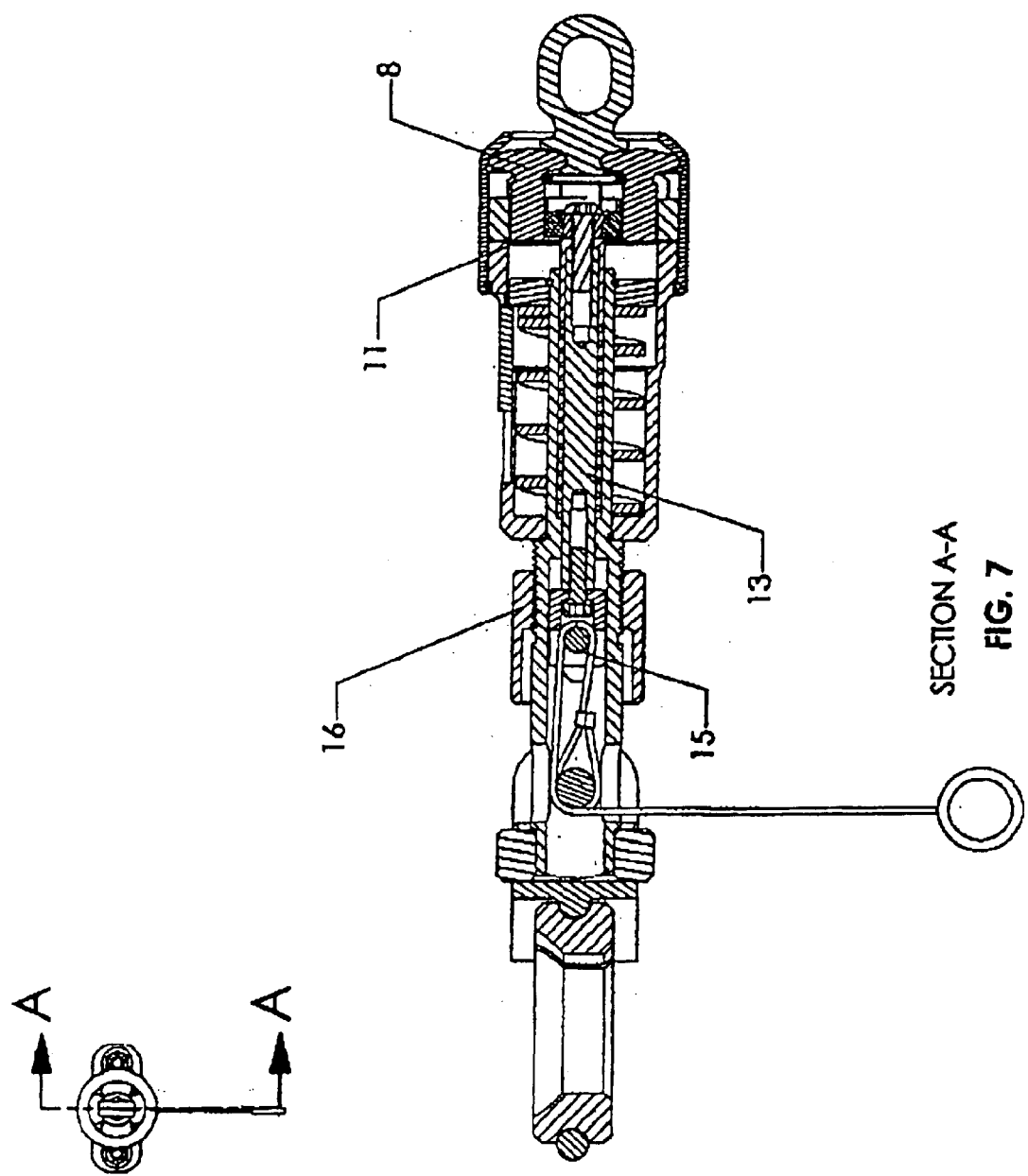
FIG. 7 is similar to FIG. 3 with the device adjusted to release at a lighter load.

The rope tension 25 and rope rotation 26 are indicated, for example, in FIG. 1. The reload motion 29 is shown in FIG. 6 and the emergency release motion 30 applied to the emergency release cable 19 is shown in FIG. 8.

In use, the device may be attached directly to the rear of a power boat by the boat attachment 21, FIG. 1. Alternatively, the boat attachment 21 may be connected to a tow rope, the other end of which is attached to the seat of a power boat.

We claim:

1. A swivel/quick release device comprising:

a shaft adapted to receive a load at one end and operably associate with a bearing means at its other end;

a housing in which said shaft is slidably mounted;

a release and attachment means disposed in said housing around said bearing means releasably retaining an attachment for a tow rope, said attachment for a tow rope being freely rotatably around said bearing means while being retained by said device; and spring means within said housing and engaging said shaft such that as a load is increasingly applied to one end of the shaft, said spring means is compressed within said housing until said attachment for a tow rope is released.

2. The device of claim 1 further comprising means for manually releasing said attachment for a tow rope.

3. The device of claim 1 further comprising a load memory for recording the maximum load applied to the device.

4. The device of claim 1 wherein said bearing means comprises a bearing surface having at least three rollers disposed therearound.

5. A swivel/quick release device comprising:

a shaft adapted to receive a load at one end and operably associate with a bearing means at its other end;

a housing in which said shaft is slidably mounted;

a release and attachment means disposed in said housing around said bearing means releasably retaining an attachment for a tow rope, said attachment for a tow rope being freely rotatably around said bearing means while being retained by said device;

spring means within said housing and engaging said shaft such that as a load is increasingly applied to one end of the shaft, said spring means is compressed within said housing until said attachment for a tow rope is released; and a load release adjuster.

6. The device of claim 5 further comprising means for manually releasing said attachment for a tow rope.

7. The device of claim 6 further comprising a load memory for recording the maximum load applied to the device.

8. The device of claim 6 wherein said bearing means comprises a bearing surface having at least three rollers disposed therearound.

* * * * *